Nov. 29, 1960
F. A. ARESTI
2,961,839
HYDRAULIC COMPRESSION MEMBER
Filed Aug. 28, 1956
3 Sheets-Sheet 1
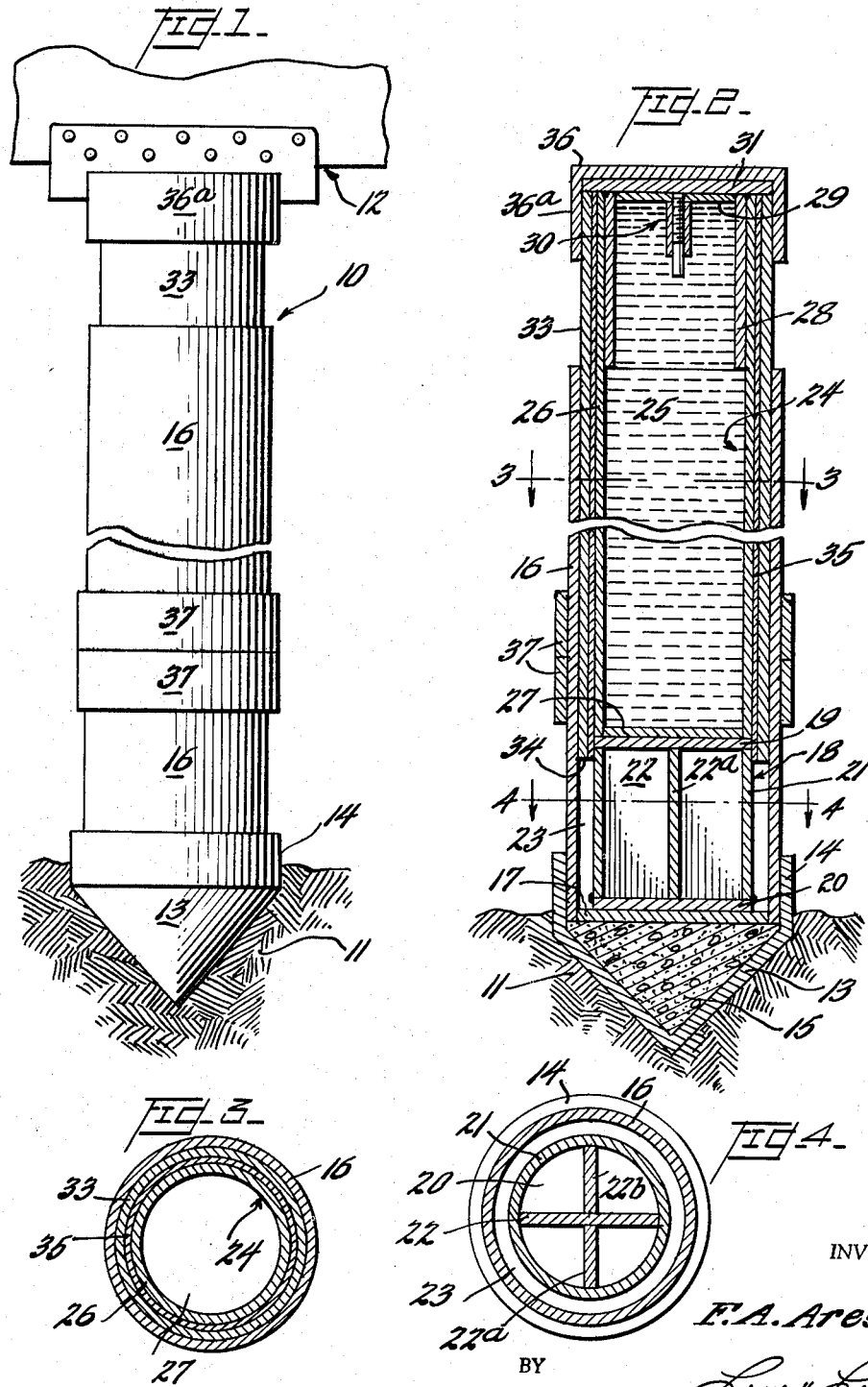
INVENTOR
F. A. Aresti,
BY
ATTORNEYS

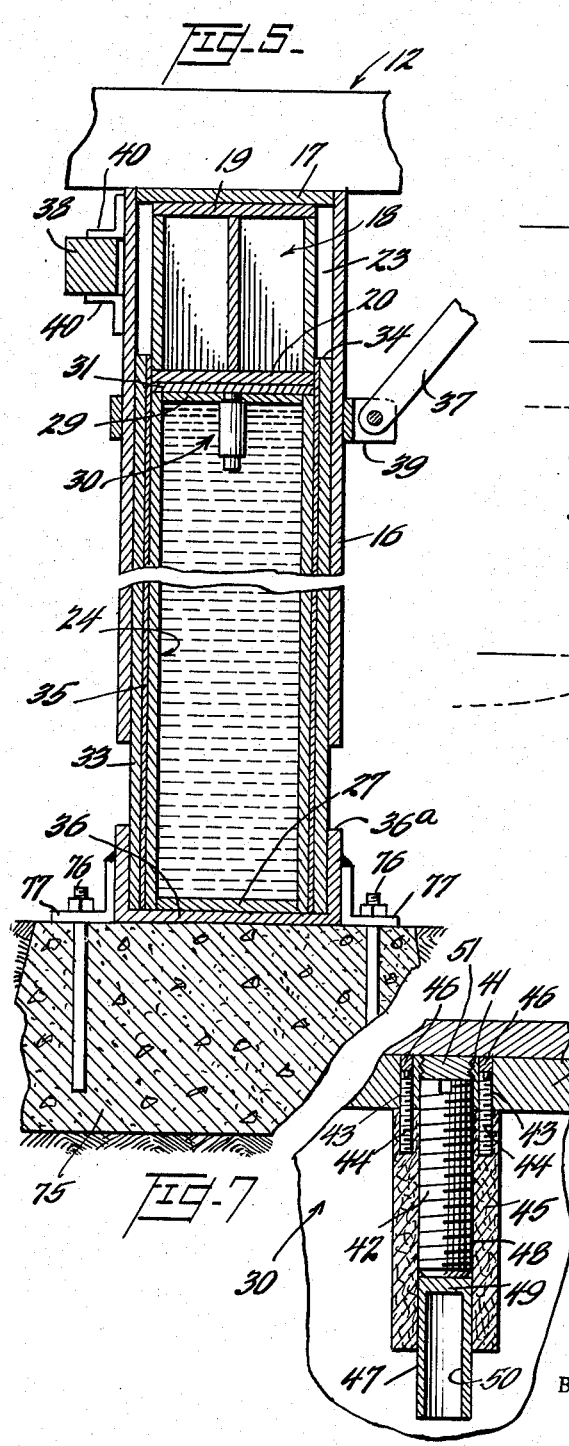

Nov. 29, 1960 F. A. ARESTI 2,961,839
HYDRAULIC COMPRESSION MEMBER
Filed Aug. 28, 1956 3 Sheets-Sheet 3
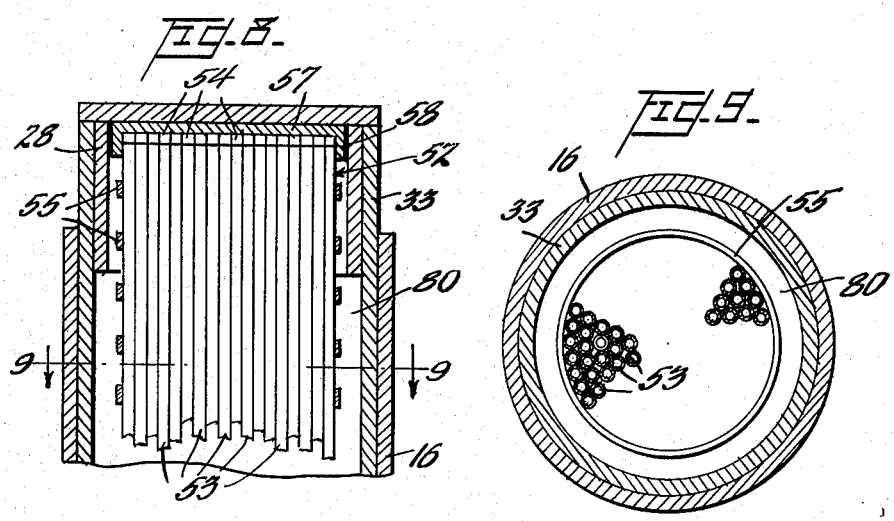
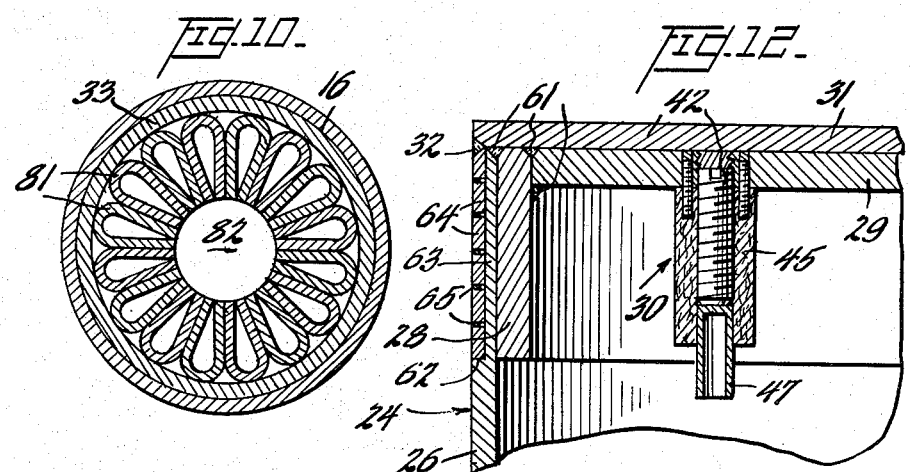
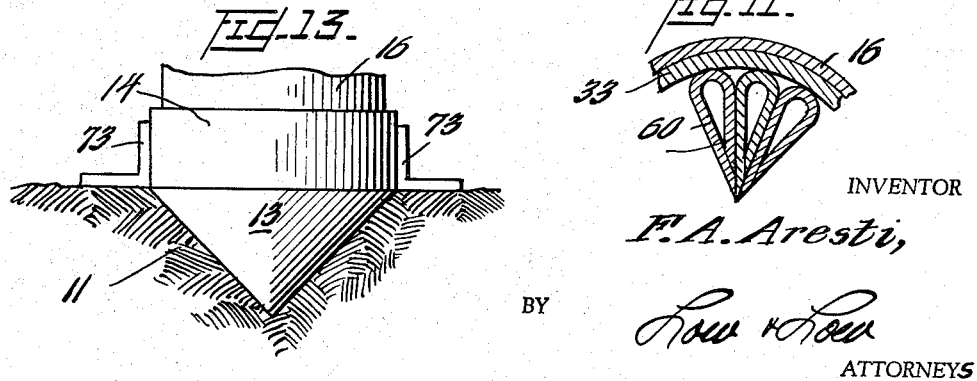
INVENTOR
F. A. Aresti,
BY
ATTORNEYS United States Patent Office 2,961,839
Patented Nov. 29, 1960

2,961,839

HYDRAULIC COMPRESSION MEMBER

Fausto A. Aresti, Arecibo, Puerto Rico
(P.O. Box 6507, Santurce, Puerto Rico)

Filed Aug. 28, 1956, Ser. No. 606,769

10 Claims. (Cl. 61—53)

This invention relates to a novel hydraulic compression member suitable for use in structures where heavy loads and pressures are encountered, such as bridges, buildings, and the like. More particularly, the hydraulic member of my invention employs a novel liquid-filled, prestressed cask assembly which sustains and absorbs the loads upon it in a manner superior to any such means heretofore used.

A major object of my invention is to provide a hydraulic compression member which, when constructed according to my disclosure, is capable of sustaining heavier loads than comparably proportioned orthodox compression members, and so requiring fewer compression members in a given application, thus effecting a major saving in labor, equipment and material expense.

Another object is to provide a compression member which is not only stronger and capable of supporting greater loads than conventional piles and columns, but also is simple to construct and features a novel means of prestress, thus requiring much less total material to support a given load.

Another object of my invention is to provide a compression member whose load-bearing capability may be readily predetermined with a relatively great measure of exactitude in comparison with conventionally constructed members whose ordinary mode of strength determination is customarily by empirical formulae, which necessitates an unduly large allowance of a safety factor due to the relative inexactitude of the empirical determination.

Another object of my invention is to provide a hydraulic compression member wherein the liquid-filled cask member or members may be any one of a variety of cross-sectional shapes, thus imparting a great range of adaptability to my hydraulic compression member in designing the same for various types of loads.

Another object of my invention is to provide a hydraulic compression member which, when employed as a friction pile, is unaffected by the phenonema of negative skin friction which can severely damage conventional piles.

Numerous other objects and advantages of my invention will appear from the following description and the accompanying drawings illustrating embodiments of my invention, it being understood that my invention is capable of being embodied in various forms without departing from the scope of the invention.

In the accompanying drawings:

Fig. 1 is a side elevation of a hydraulic compression member embodying by invention.

Fig. 2 is a sectional elevation of one embodiment of my hydraulic compression member when employed as an end load-bearing pile.

Fig. 3 is a transverse section taken along the line 3—3 of Fig. 2.

Fig. 4 is a transverse section taken along the line 4—4 of Fig. 2, near the base of the pile.

Fig. 5 is a sectional elevation of the hydraulic compression member adapted for use as a load-bearing column.

Fig. 6 is a sectional elevation of another form of the hydraulic pile, wherein a plurality of liquid-filled casks are illustrated, and showing a representation of earth strata in which the pile may be embedded.

Fig. 7 is a fragmentary sectional elevation illustrating a detail of the cask cap screw assembly.

Fig. 8 is a fragmentary sectional elevation illustrating a modification of the liquid filled cask assembly.

Fig. 9 is a transverse section along line 9—9 of the modified cask assembly of Fig. 8.

Fig. 10 is a transverse section of the hydraulic compression member illustrating a second modification of the liquid-filled cask assembly.

Fig. 11 is a fragmentary transverse section of the hydraulic compression member illustrating a third modification of the liquid-filled cask assembly.

Fig. 12 is an enlarged sectional elevation illustrating a detail of the top of the liquid-filled cask of the preferred embodiment shown in Figs. 2, 5 and 6.

Fig. 13 is a partial side elevation illustrating a slightly modified base assembly from that shown in Fig. 1.

In general, my novel hydraulic compression resisting member comprises one or more relatively long thin-walled metal casks which have been filled with a liquid, for example water, and prestressed by means of prepressurizing the liquid. The casks are encased within an inner tube which extends the full axial length of the cask or casks. The bottom end of the lowermost cask is supported by a foot stand which in turn rests upon a base plate within a concrete-filled shoe provided in suitable earth strata. An outer tube encloses substantially the entire length of the inner tube, and extends axially therepast at its lowermost end into the shoe, thus providing a free space. While I have shown only the hard earth strata at 11 as the foundation upon which the pile assembly rests, it is understood that the pile is often sunk through levels of various earth media before such hard earth foundation is reached. Fig. 6 is illustrative of various earth strata in which a pile may often be embedded.

A cap overlies the top end of the uppermost cask and comprises the bearing surface for the structures subsequently erected upon the pile.

When the hydraulic compression member is employed as a column rather than a pile, the above described structure is substantially inverted, with the cap at the lowermost end adjacent the shoe, and the foot plate at the top of the assembly.

In the design and construction of all conventional compression members, such as columns, piles, struts, and posts, there are three fundamental factors which must be considered in determining the strength of the compression member. They are: (1) the load upon it; (2) the eccentricity of the resultant of this load; and (3) the height or length of the particular compression member. This last factor is the most important, for even if the load to be applied has been determined, and the location of the resultant has been ascertained, and other secondary factors are known, such as the shape of the member and the material from which it is made, it is still not known whether the compression member will sustain the load until the length of the column relative to its diameter is established. This factor is commonly referred to as the $L/R$ ratio (length of member/radius of gyration).

It is a major disadvantage of the design and engineering of the present compression members that their load sustaining capacity is directly dependent upon the $L/R$ ratio, as reflected by empirical formulae, that is to say, substantially determined by trial and error, and of necessity requiring the allowance of an unduly large safety factor, which adds to the expense of construction.

It is conversely a major advantage of my invention from the design and engineering standpoint, that the load capacity of my hydraulic compression member is accurately ascertained by mathematical formulae which do not rely upon or involve the $L/R$ ratio, as such, in any form. Therefore the load capacity of any particular compression member of my design does not vary with a variation in the length or height of said member.

I have found that the strength or load bearing capacity of my hydraulic compression member may be shown and accurately determined in the following manner, wherein:

$M=$ applied axial load in pounds.
$h=$ length or height of cylinder in inches.
$A_L=$ cross-sectional area of liquid in square inches.
$A_{s_1}=$ cross-sectional area of cylinder walls in square inches.
$A_{s_2}=$ cross-sectional area of tube walls in square inches.
$\epsilon s_1=$ shortening of cylinder walls due to load "M" in inches.
$p=$ pressure of liquid in pounds per square inch.
$E_1=$ Modulus of elasticity of cylinder walls in pounds per square inch.
$E_2=$ Modulus of elasticity of tube walls in pounds per square inch.
$Q=$ Total compressive stress in cylinder walls due to load "M" in pounds.
$\Delta V=$ Reduction in volume of liquid due to pressure "p" in ins.$^3$.
$k=$ Coefficient of compressibility of liquid in 1/lbs.$^2$.
$\Delta a=$ Increase in cross-sectional area of cylinder due to "p" in ins.$^2$.
$V_L=$ Volume of liquid in ins.$^3$.
$q=$ A quantity equal to $$\frac{\Delta a E_2}{p}$$

Thus we have:

(1) $\qquad A_L \epsilon s_1 = \Delta a(h - \epsilon s_1) + \Delta V$

This equation applies the law of conservation of mass. It states that the volume of liquid in the cask before application of the load equals the volume of liquid in the cask after the load is applied plus the volume loss of the liquid incurred in the process. The loss in volume of the metal in the cask walls when pressure is applied is negligible, and is disregarded.

(2) $\qquad M = Q + pA_L + p\Delta a$

This equation states that the hydraulic compression member is in a state of static equilibrium in the vertical direction under load.

(3) $\qquad M\epsilon s_1 = Q\epsilon s_1 + pA_L \epsilon s_1 + p\frac{\Delta a}{2}\epsilon s_1$ This equation applies the law of conservation of energy. It states that the total amount of energy applied to the body has been used in work done by the body.

By proper substitution of Equation 1 in Equation 2, Equation 3 will result, except for the small difference of $$p\frac{\Delta a}{2}\epsilon s_1$$

which difference may be ascribed to molecular friction loss.

Thus the two independent Equations 1 and 2 relate fully the various elements of the problem, wherein only "p" and "Q" are unknown. By substituting in Equations 1 and 2 the following equalities:

$$\epsilon s_1 = \frac{Qh}{A_{s_1} E_1}; \quad \Delta a = \frac{qp}{E_2}; \quad \Delta V = pkV_L = pkA_Lh$$

and solving the equations simultaneously, we obtain the value of "p" to slide rule accuracy, thus:

(4) $\qquad p = \dfrac{M}{A_L + A_{s_1} E_1(q/A_L E_2 + k)}$

It can be shown that:

(5) $\qquad q = \dfrac{2\pi r^3}{t}$ for a thin-walled cylinder, and $$q = \frac{2\pi r^2[(r+t)^2 + r^2]}{(r+t)^2 - r^2}$$

where the cylinder is thick-walled.

Having thus solved for "p," we may now substitute the proper values in Equation 2 and easily derive the value of "Q." The value of "q" is determinated by the above Equations 5 regardless of the cross-sectional shape of the hydraulic compression member, whether it is circular, elliptical, or any other shape. This is important as it allows the selection from an almost infinite variety of cross-sectional shapes and forms in designing and constructing the most suitable hydraulic compression member for the application envisioned. Knowing the stresses "p" and "Q" for any presumed "M" or load, it is a simple design matter to provide cask and tube material of the required strength to withstand these known stresses.

Referring to the drawings, and particularly to Figs. 1 and 2, I have shown an embodiment of my invention as an end-bearing pile generally designated at 10 seated in suitable hard earth strata 11 and supporting a structural load indicated at 12. A conical shoe or base 13 having an upstanding circumferential wall 14 is partially filled with concrete as at 15 to provide a firm seat for the hydraulic pile.

Seated within the shoe or footing 13 and resting upon the concrete filler 15, is an elongated cylindrical outer tube or shell 16 closed at its bottom by a base plate 17 welded thereto. A foot stand indicated at 18 comprises an upper circular foot plate 19, a lower circular foot plate 20, a cylindrical tube 21 disposed between the foot plates 19 and 20, and secured to the same, and vertically disposed plates or strut members 22, 22a and 22b arranged in the form of a cross within the tube 21, as clearly shown in Fig. 4. The members 19, 20, 21, 22, 22a and 22b are welded at their contacting faces to provide the braced rigid foot stand 18 which is secured as by welding concentrically of the base plate 17, leaving an annular free space 23 between the outer tube 16 and the cylindrical tube 21 of the foot stand. The provision of the free space 23 is essential to the functioning and proper operation of the hydraulic compression member, as will be described later.

It is to be understood that the described construction of the foot stand assembly 18, as well as of the shoe or footing 13, are illustrative only as one practical means of forming the same, and that any convenient means of forming a foot stand or shoe assembly may be employed without altering the operation of the hydraulic compression member.

A cask 24 of aluminum or aluminum alloy is filled with a liquid 25 such as light oil or deactivated water, and comprises an elongated cylindrical shell wall 26 closed at its bottom by a welded plate 27 (see Figs. 2 and 12) and at its top by cylindrical stiffener 28, cap 29 and cap screw assembly 30. Cap plate 31 overlies the top closure assembly just described, and is secured to the top of the cask walls by circumferential weld 32. The liquid-filled cask 24 rests with its bottom plate 27 upon upper foot plate 19 of the foot stand 18 and is supported thereby.

The cask 24 extends upwardly substantially beyond the top of the outer tube 16 and is encased throughout its axial length by an inner cylindrical tube or shell 33.

The inner tube or shell 33 is telescopically received within the outer tube 16, and its lowermost end 34 defines the upper limit of the free space 23. The inner tube 33 may conveniently be made of steel, as is the outer tube 16, or they both may be made of aluminum or any other suitable metal or alloy. In the event, however, that the inner tube 33 is of a different material than cask 24, a lining 35 of asphalt, paint, enamel, cement or similar material is provided between the cask walls 26 and the inner tube 33. This lining is necessary to prevent undesirable electrolytic action and decomposition between the contacting outer surfaces of cask wall 26 and the inner wall surface of tube 33.

A cover cap 36 having downturned circumferential flange 36a snugly encloses the top of the pile assembly, and serves as the bearing surface for the load structure 12 erected upon the pile, as shown in Fig. 1. The spacing of the lower end of flange 36a from the top of the outer tube 16 should be substantially the same distance as the height of free space 23 between the base plate 17 and the lowermost end 34 of the inner tube 33.

Where the hydraulic pile assembly 10 is of extreme length, on the order of 1000 feet or more, reenforcing water pressure rings 37 of metal are provided around the outer tube 16 positioned from the lowermost end up of the liquid filled cask 24, as required, two of which are illustrated in Fig. 1.

In Fig. 5 is shown an embodiment of my hydraulic compression member when employed as a column. The distinction between a pile and a column is essential to a clear understanding of the scope of the invention. As a pile (Figs. 1, 2 and 6) the member is loaded by a single load at its top upon cover cap 36, and the free space 23 will always be at the bottom, beneath the lowermost end 34 of the inner tube 33. When constructed as a column, the member may have any number of structural loads applied thereto by means of beams or struts resting upon metal seats secured to the outer tube anywhere along its length, as will be hereinafter described in conjunction with Fig. 5.

The hydraulic compression structure when employed as a column (Fig. 5), is substantially inverted in position from that of the pile arrangement shown in Fig. 2. Cover cap 36 is inverted and seats upon a modified concrete footing 75 and is tied down or secured thereto by anchor bolt assemblies 76 embedded in the concrete footing 75 and bolted to apertured angle plates 77 which in turn are welded to cover cap flange 36a. Inner tube or shell 33 in like manner seats within the upturned flange 36a of cap 36. Liquid-filled cask 24 is positioned within inner tube 33, separated therefrom by lining 35, if such a lining is employed as mentioned earlier. It should be noted that the cask 24 is in upright position in the column of Fig. 5, as it is in the pile of Fig. 2, that is, with the cap screw assembly 30 and cap plate 31 at the top of the cask, bottom 27 of the cask thus being seated upon the inner face of inverted cover cap 36.

Foot stand 18, constructed as previously described, is seated upon the cask 24 with the lower foot plate 20 resting upon cap plate 31, nested just within the topmost end of the inner tube 33, and provides the support for outer tube or shell 16. The outer tube 16 is inverted from its position shown in Fig. 2 and telescoped over the foot stand 18 and the inner tube 33 so as to be positioned with its base plate 17 supported by upper foot plate 19 of foot stand 18. As in the instance of the heretofore described pile arrangement, an annular free space 23 is provided between cylindrical tube 21 of the foot stand and outer tube 16. The length of the free space 23 is determined by the base plate 17 of the outer tube 16 and the now topmost end 34 of inner tube 33. Thus the free space 23 in the column of Fig. 5 is located near the top of the column assembly, as compared with its location near the bottom of the pile assembly of Fig. 2.

The provision of the entire elongated outer tube 16 and plate 17 as the topmost member of the hydraulic column of Fig. 5, permits not only the endwise support of a structural load as at 12, but may also support additional structure such as, for example, strut members, one of which is represented at 37, and/or beam members, one of which is represented at 38, by means of suitable clamping braces as at 39, or metal seats as at 40, secured to the wall of the outer tube 16.

The operation of the hydraulic compression member disclosed in Figs. 1 to 5 will now be described, including further important details of assembly and construction.

In brief, with reference especially to Fig. 2, the load 12 is borne by the cover cap 36 which in turn transmits the load to the prestressed liquid-filled cask 24. The load, which may be a building structure, bridge or the like, may well be on the order of 100 or 200 tons, compresses and vertically shortens the cylindrical cask wall 26, thus creating substantially uniform pressure in all directions of the liquid 25 within the cask 24. There is in addition a slight volume loss of the liquid itself. The lateral vector of pressure of the liquid 25 within the cask 24 is exerted against the cask wall 26, the inner tube 33 and the outer tube 16, creating a tensile stress in these members resisting the applied load 12. The total vertical vector of liquid pressure, together with the cask wall pressure, bears upon the upper foot plate 19 of the foot stand 18, and is transmitted therethrough to the base plate 17, to the shoe 13, and thence to the hard earth strata 11 in which the shoe 13 is seated and embedded.

The compression of the cask wall 26 permits the inner tube 33 to move down into the free space 23 a distance equal to the extent of vertical shortening of the cask wall.

In the hydraulic pile member of my invention the outer tube 16 and the inner tube 33 carry no load. This is because of the provision of free space 23 permitting relative axial movement of the inner and outer tubes. The tubes 16 and 33 serve the primary purpose of protecting the load-bearing liquid filled cask 24 from damage. In installations where there is an eccentric loading of the hydraulic compression member, the inner and outer tubes absorb any bending moments and shear stresses that may exist.

It is the liquid 25 exerting its uniform pressure in all directions within the cask 24, thus preventing any tendency to buckle, which gives my hydraulic compression member its ability to sustain very heavy structural loads at comparatively small cost. In theory, only a very small liquid pressure against the cask wall 26 would be necessary to prevent buckling. In practice, however, it is advisable to always maintain a substantial pressure, in the vicinity of 300–400 lbs. p.s.i. upon the cask walls.

Because of this necessity of maintaining uniform pressures at all points within the cask to prevent buckling of the side walls of the pile assembly, a true liquid must be employed as the load absorbing medium, rather than any gaseous medium, such for example as air within the cask. Were some gaseous medium employed rather than a liquid for resisting the load stresses, it would be completely unsatisfactory, i.e.

(1) Using gas at relatively low pressure of from 100 to 200 lbs. p.s.i.

Under Charles' law of gases, and using these low pressures, a drop in the ambient temperature will result in very little or no gas pressure in the cask, resulting in sudden failure of the pile under its load.

(2) Gas at very high pressures of from 4000 to 5000 lbs. p.s.i.

In this case a rise in the ambient temperature of say 100° would increase the pressure within the cask so greatly that the design and construction of the tube walls would be impractical and uneconomic.

Furthermore, Equation 4 from which my compression member is designed, would not hold true, for at such extreme gaseous pressures there is no determinable correlation between the load imposed and the stresses resulting therefrom. In other words, it would not be possible to determine or predict what load this gas filled compression structure could safely bear. This in itself would leave no real advantage over the conventional pile or column.

(3) Gas at intermediate pressures, around 1000-2000 p.s.i.

This will present much the same difficulty as would be encountered at high pressures. In addition there would be the danger of internal convection currents within the cask 24 due to temperature differentials along the pile body. The active fluid pressure within the cask must be exerted upon each and every square unit of surface of the cask walls at all times. Convection currents, however, could create a zone of zero pressure on the cask walls, and regardless of the interval of time this zero zone lasted, there would be a resulting buckling and sudden failure of the pile.

Thus it is seen that only a liquid-filled cask will have the necessary compression strength for utilization in my invention.

The liquid 25 within the cask 24 must be a true liquid, i.e. a liquid which transmits pressure according to Pascal's law. The liquid must also have a known coefficient of compressibility. This is necessary as Equation 4 from which I design my compression member, requires that the coefficient of compressibility "$k$" be a known factor. Water is such a liquid which may be used, and possesses the decided advantage of being inexpensive and readily available. This is important when it is remembered that the casks may be 60 to 100 feet in length, or even longer, and that a plurality of casks end to end may be used, as illustrated in Fig. 6. Other liquids, for example light oil, or even mercury may be used as the liquid 25 within the cask. Before the liquid 25 is placed within the cask it must be treated. This can usually be done in the field at the site of installation of the pile or column, and consists in deactivating the liquid so as to prevent any possible long-run corrosive action on the cask walls, and the addition of suitable freezing preventatives in installations where the possibility of freezing must be allowed for.

The cask material itself for utilization in my compression member must meet the following criteria:

(1) A liquid proof substance for the pressures and liquid involved.
(2) A well defined modulus of elasticity.
(3) A measurable area of cross-section.
(4) A high yield point.
(5) A high tensile strength.
(6) A high resistance to fatigue.
(7) Easily workable and easily handled, and
(8) Readily available at reasonable cost.

One such material which I have found to well fulfill each of the above requirements is an aluminum alloy.

The material from which the inner tube 33 and the outer tube 16 are fabricated should similarly preferably have a modulus of elasticity higher than that of the cask material. Certain aluminum alloys are suitable for the tube material, as well as many readily available grades of steel.

I have stated that it is advisable to maintain at least a pressure of approximately 300 to 400 lbs. p.s.i. within the cask. To insure that substantial pressure in the liquid will exist even when there is no load on the pile or column, I prepressurize the liquid 25 within the cask at the time the cask is filled. One means of accomplishing this is illustrated in Fig. 7, which is an enlarged sectional view of the cap screw assembly 30. Cap 29, before being circumferentially welded to the top inner surface of the cask wall 26, is provided with a threaded bore 41 for reception of the elongated cap screw 42. A plurality of smaller threaded bores 43, two of which are shown, are provided at equal radii from the center line of bore 41 for reception of screws 44. A fibre sleeve 45 provided with a bore 48 is positioned concentrically of the threaded bore 41 and is secured tightly to the lower face of cap 29 by means of the screws 44. The screws 44 are sunk in their bores 43 beneath the level of the upper surface of cap 29, and the open bores 43 above the screw heads are filled with metal, as at 46. The cap 29 is then secured to the cask walls 26, or to stiffeners 28, if they are used, and transported to the field. Cask 24 is then filled with liquid 25 through threaded bore 41 and fibre sleeve 45. In order to pre-pressurize the liquid 25 before sealing of the cask, a soft metal sleeve 47 having one closed end 49, is inserted closed end uppermost through bore 41 and into fibre sleeve 45. Cap screw 42 is threaded into bore 41 and as it is driven inwardly by suitable screw driving means, the cap screw 42 bears against metal sleeve end 49, thus driving the sleeve 47 inwardly against the resisting pressure of the liquid 25. Liquid cannot escape through the bore 48, for as the sleeve 47 enters inwardly, water pressure will bear with increasing force against the inside wall 50 of the soft metal sleeve 47, thus pressing the same tightly and firmly in leakproof relation against the inner wall of fibre sleeve 45. In this manner the desired substantial pressurization of the liquid inside the cask 24 may be obtained, after which the open bore 41 above the cap screw 42 is filled with metal as at 51, as by welding. Cap plate 31 is then laid over the top of the cask 24 and securely welded to the cask by circumferential weld 32 (Fig. 12).

It may be noted that this method may be employed to prepressurize the liquid to the extent of 3000 to 4000 p.s.i., thereby imparting to the cask walls 26 substantial tensile prestress, thus greatly increasing the capacity of the pile, instead of merely to the desired minimum range of 300-400 p.s.i.

An alternative means by which I can prepressurize the liquid within my hydraulic compression member is by filling the cask 24 with a heated liquid. In this instance, a threaded base and plug closure is provided at the top end of the cask. Heated liquid is then introduced into the cask, filling the same to the top as before. The screw plug is then inserted and welded securely to the cap 29, and cap plate 31 is overlaid to the cap 29 and welded in place. The heated liquid heats the walls of the cask, expanding the same and thus permitting a greater amount of liquid to be introduced within the cask than would be the case if the liquid were at normal temperatures.

When the heated liquid cools to the ambient temperature prevailing around the hydraulic compression member, the cask walls will contract thus decreasing the capacity of the cask. As the now relatively cool liquid has contracted proportionately much less than the cask, it will exert a substantial pressure on the walls of the cask and achieve the desired prestress in the cask material. The amount of prepressurizing thus attained can be closely regulated to any desired amount, knowing the characteristics and physical constants of the cask material and the liquid.

This alternative method of prepressurization is especially suitable for use with my modified casks of Figs. 8 to 11 inclusive. In Figs. 8 and 9 I have shown a cask assembly 52 comprising a plurality of small tubes or cells 53, each closed by a cap 54 welded thereon. The individual cells 53 are held in tangently adjacent relationship by a plurality of encircling metal bands 55 vertically spaced at intervals throughout their length. At the top of the cells 53, a circular head plate 57 having a downturned peripheral flange 58 is secured to the caps 54 of the cells 53. A circular stiffener 28 is interposed between head plate flange 58 and inner tube 33. The modified cask assembly 52 of Figs. 8 and 9 is used in place of the single large cylindrical cask 24 shown in Fig. 1. The cells 53 preferably are filled with and prestressed by the hot liquid method, rather than with a relatively cool liquid used in conjunction with the cap screw assembly 30, although the latter method could be employed if desired. Where the plurality of individual circular cells 53 are employed, there is an annular space 80 between the banded cells 53 and the inner tube 33 (Fig. 8).

As shown in Figs. 10 and 11 the individual cells of the modified cask assembly may be of other than circular cross sectional configuration.

Referring to Fig. 10, a horizontal section through my hydraulic compression member shows the outer tube 16, the inner tube 33, and a plurality (illustrated as sixteen in number) of elongated cells 81 having a cross-sectional configuration of a closed horseshoe. The cells 81 are arranged and secured as by welding, in a symmetrical circular pattern and define thereby a substantially cylindrically shaped space 82 centrally of the pile member. The cells 81 may be closed at their top ends by cap screw assemblies 30 (Fig. 7) or by caps similar to the caps 54 employed to seal cells 53 in Fig. 8. The space 82 as well as the cells 81 are filled with the liquid.

In Fig. 11 a further modification illustrates the cells 60 similar to the cells 81 in Fig. 10, but with the walls of the cells 60 of teardrop cross sectional configuration, and thus extending inwardly centrally of the pile structure, eliminating any central open space such as 82 in Fig. 8. The cells 60 are liquid filled as before.

It is important to note that the liquid-filled cell or cells may be of any desired cross-sectional form, for example, elliptical, triangular, a closed curve or the like, and still function in the manner contemplated in my invention. This is true, as all closed shapes of the same material, irrespective of their cross-sectional configuration when placed under the same internal fluid pressure, will expand the same amount if they are of equal cross-sectional area. With reference to Equation 4 the "$q$" of any shape is the same as the "$q$" of a circular shape having the same cross section. Thus Equation 4 from which my hydraulic compression member is designed, is of universal application in determining the load characteristics of my hydraulic compression member, regardless of the cross sectional configuration of the filled cells.

Fig. 12 illustrates in detail one means of providing a stiffener 28 within the hydraulic compression member. The stiffener 28, seen also in Fig. 2 and at 59 in Fig. 8, is a short length of steel pipe or the like secured within the cask (Figs. 2 and 12), or within the inner tube 33 (Fig. 8) and extending vertically immediately beneath the cap plate 31 to a point lying substantially on the horizontal plane of the topmost end of the outer tube 16, as clearly seen in Fig. 2. When used in conjunction with a single cask 24 (Fig. 12) the stiffener may be secured to the cask wall 26, cap plate 31, and cover 29 by suitable welds 61. As an additional reenforcement on the outside of the cask wall 26, the outer surface of the cask wall may be shouldered as at 62 to provide a reduced wall portion 63. A plurality of metal rings 64 are shrink fitted in spaced relation upon the reduced wall 63 and secured positively by circumferential welds 65.

Where the cask comprises a plurality of cells, as in Fig. 8, and a stiffener 28 is employed, it is secured to the inner wall of the inner tube 33 beneath the cap plate 31.

The purpose of the stiffener is to provide added thickness to the walls of the hydraulic compression member whereby a substantially equal cross-sectional area of metal exists in the high compression member at any point in its length. The stiffener is however not strictly essential and may be omitted if it is found desirable to do so.

An important feature of my hydraulic compression member is that negative skin friction has no effect upon its load bearing capacity. When a conventional load-bearing member is employed as a friction pile, the effect of negative skin friction may be such as to cause damage to or even complete failure of the pile member. In Fig. 6 I have illustrated my hydraulic compression member typically embedded for use as a friction pile in a lowermost layer of hard earth or rock strata 11, a layer of sandy clay commencing at 66, a layer of soft muddy peat commencing at 67, and a layer of top fill dirt commencing at 68. Three liquid-filled casks 24 are placed in end to end relation within the inner tube 33 of the hydraulic pile structure 10. A concrete dummy 69 rests upon the cap plate 31 of the topmost cask 24, and is also nested within the inner tube 33. The concrete dummy 69 is made to a closely determined length in the field in order to finish the hydraulic pile to its required length. The use of a dummy 69 is not necessary, of course, where the final length of the pile structure is known and the casks 24 are available in lengths or combinations of lengths, which meet the precise pile structure length previously determined.

The zone of muddy peat in Fig. 6 precludes the erection of any structure on that land without the sinking of friction piles beforehand, as the muddy peat slowly consolidates and settles under its own weight, and much more rapidly with the additional load of a structure erected thereon. Thus friction piles to support the load structure are sunk down into the former sandy clay and hard earth strata, while fill dirt is deposited upon the muddy peat. At first, with the earth strata levels approximately as shown at 66, 67, 68, the conventional pile will support its load structure, assisted by the resistance of the sandy clay and the hard earth strata 11. With the continued consolidation of the muddy peat under its fill dirt load, and the addition of further fill dirt, as shown by broken line 72, however, the earth strata situation is very much changed. The sandy clay has been compressed and displaced from its former level at 67 to a lower position 71 under the weight of the fill dirt transmitted to it through the consolidating muddy peat. The sandy clay now resists further downward displacement under the weight of the fill dirt and exerts a downwardly directed gripping pressure upon the pile, as indicated by arrows 70. The pile thus receives an additional load, which may not have been contemplated by the designer and which often could not possibly be allowed for at all. This unique behavior of certain earth strata upon a friction pile is known as negative skin friction. The downward pull of the negative skin friction effect upon the conventional pile can be serious enough to cause failure of the pile. With my hydraulic pile, however, as shown in Fig. 6, it will be seen that no additional load is imparted to the load-bearing liquid filled casks 24. The sandy clay can only grip the outer tube 16 which does not carry the load of the erected structure, and none of the downward pull acts on the structural load bearing casks 24 themselves.

In Fig. 13 I have shown a modified form of shoe 13 wherein substantially right-angular load distributing plates 73 are secured to the upstanding circumferential flange 14 of the shoe 13. The plates 73 are advantageous when the hard earth or rock strata 11 has insufficient strength in the bearing surface of the shoe 13 to support the hydraulic pile load. The plurality of load distributing plates 73 distribute the load of the pile over a greater surface area of hard earth or rock 11 and so lower the unit stress upon the same under a given load.

For purposes of fully understanding my invention, I will now describe one manner by which my hydraulic compression member may be assembled and driven.

Let us assume that the particular hydraulic compression member is an end bearing pile of the nature shown in Figs. 1 and 2. Suitable earth borings are taken at the site of installation whereby the approximate location of hard earth strata or rock profile 11 is ascertained, and it is thus estimated that the rock will be found at a depth no lower than 70 feet. A 75 foot length of outer tube 16 is provided with the footstand 18 and shoe assembly 13, and is driven by means of a mandrel. Rock is then encountered at a depth of 59.3 feet. An analysis of all load factors integrated with Equation 4 shows the cask load to be about 92,500 pounds. The outer tube 16 is cut at a three foot height above ground level and a 60 foot cask 24 is selected. The cask 24 is thoroughly oiled along its sides and is slung from the driving rig and let down very slowly and carefully into the outer tube 16, being certain that the cap screw bore 41 is facing upwardly. A water tank is brought to the site and treatment, if any is desired, is given to the water. The cask 24 is then filled very slowly from the bottom by means of a hose, after which the cap screw assembly 30 is completed by means of a suitable screw driving rig to prepressurize the liquid within the cask. The cap plate 31 is braze welded to the cask. A concrete dummy 69 (Fig. 6) is made to the appropriate length determined in the field. The dummy 69 is placed upon the cap plate 31, after which the inner tube 33 is slowly lowered into place over the cask and dummy and within the inner tube 16. The inner tube 33 should be thoroughly oiled inside and out with a pressure hose, and lowered very carefully to prevent any possible damage to the cask. The cover cap 36 is secured to the top of the assembly, and the completed hydraulic compression member is ready to receive the upper load structure.

The cask may be introduced into the inner tube 33 on the horizontal, after which they are both lowered into place as one unit. If a lining 35 is employed, an asphalt or enamel paint should be applied to the outer surface of the cask wall 26 before final assembly of the structure.

It is thought that the invention and many of its attendant advantages will be understood from the foregoing description, and it will be apparent that various changes may be made in the form, construction and arrangement of the parts without sacrificing all of its material advantages.

What is claimed is:

1. A hydraulic compression member having its lowermost end seated upon a conventional shoe assembly, comprising an elongated liquid-filled cask, said liquid having an initial internal prestress, an inner tube slidably enclosing said cask throughout its axial length, a foot stand abutting the lower end of said cask, said foot stand having transverse dimensions substantially equal to the transverse dimensions of said cask, an outer tube slidably and snugly enclosing a major axial portion of said inner tube and said foot stand to provide an annular free space between said outer tube and said foot stand, a base plate abutting the lower end of said foot stand and secured to the lower end of said outer tube, a cover cap enclosing the upper end of said inner tube, whereby said cask supports the entire load subsequently applied to said member as said inner tube moves axially into said free space as a result of load imposed compression of said cask.

2. A hydraulic compression member having a predeterminable load capacity for supporting massive structural loads, comprising an elongated liquid-filled cask for receiving and supporting a subsequently applied load, said cask being composed of a material having a well-defined modulus of elasticity, said liquid within said cask having an initial internal prestress independently of any applied load, an inner tube coextensive with said cask and slidably and snugly corseleted thereabout for insuring uniform compression of the cask walls under applied load and absorbing resultant cask hoop stresses, an outer tube closely slidably encompassing the major axial extent of said inner tube, said outer tube having a closed end extending beyond the adjacent ends of said inner tube and cask, and means within said closed end of said outer tube interposed between and rigidly spacing said closed end and said cask, said spacing means having transverse dimensions adjacent said inner tube end substantially equal to the transverse dimensions of said cask, whereby said outer tube and said spacing means cooperate to provide an annular free space adjacent said inner tube end to permit movement of said inner tube into said free space as said cask is compressed under a massive structural load applied thereto.

3. A hydraulic compression member as set forth in claim 2 wherein said cask is comprised of a plurality of elongated individual liquid filled cells disposed in closely grouped abutting relation.

4. A hydraulic compression member as set forth in claim 3 wherein the individual cells are of substantially teardrop cross-sectional configuration.

5. A hydraulic compression member as set forth in claim 2, wherein said closed end of said outer tube is disposed at the top of said member in a column construction.

6. A hydraulic compression member as set forth in claim 2, wherein said closed end of said outer tube is disposed at the bottom of said member in a pile construction.

7. The hydraulic compression member of claim 2 wherein said liquid within said cask has a lesser coefficient of expansion than said cask.

8. A hydraulic compression member comprising an elongated liquid-filled cask, said liquid having an initial internal prestress, an inner tube slidably enclosing said cask throughout its axial length, a foot stand abutting the upper end of said cask, said foot stand having transverse dimensions substantially equal to the transverse dimensions of said cask, an outer tube slidably and snugly enclosing a major axial portion of said inner tube and said foot stand to provide an annular free space between said outer tube and said foot stand, an end plate abutting the upper end of said foot stand and secured to the upper end of said outer tube, and an end cap enclosing the lower end of said inner tube, whereby said cask supports the entire load subsequently applied to said member as said outer tube moves axially downwardly resulting from load imposed compression of said cask to thereby diminish said annular free space.

9. The hydraulic compression member of claim 2 wherein the initial internal prestress of the cask liquid exerts a minimum pressure of 300 pounds per square inch.

10. The hydraulic compression member of claim 2 wherein a plurality of said casks are employed and are disposed in end-to-end relation, and said closed end of said outer tube extends beyond the adjacent end of an endmost cask.

References Cited in the file of this patent

UNITED STATES PATENTS

| | | |
|---|---|---|
| 291,208 | Leslie | Jan. 1, 1884 |
| 511,472 | Sumovski | Dec. 26, 1893 |
| 616,084 | Davis | Dec. 20, 1898 |
| 873,517 | DeWitt | Dec. 10, 1907 |
| 996,397 | Breuchaud | June 27, 1911 |
| 1,143,645 | O'Rourke | June 22, 1915 |
| 1,181,212 | Clark | May 2, 1916 |
| 2,023,966 | Montee | Dec. 10, 1935 |
| 2,313,625 | Cobi | Mar. 9, 1943 |
| 2,334,386 | Cortella | Nov. 16, 1943 |
| 2,550,674 | Curtis | May 1, 1951 |
| 2,830,443 | Burrell | Apr. 15, 1958 |

FOREIGN PATENTS

| | | |
|---|---|---|
| 73,035 | Netherlands | Aug. 15, 1953 |
| 700,444 | Great Britain | Dec. 2, 1953 |